2,854,487

PROCESS FOR THE MANUFACTURE OF CARBINOLS

Denis Cheselden Quin, Teddington, England, assignor to The Distillers Company Limited, Edinburgh, Scotland, a British company No Drawing. Application March 27, 1956
Serial No. 574,070

Claims priority, application Great Britain April 12, 1955

7 Claims. (Cl. 260—618)

The present invention refers to an improvement in and a process for the manufacture of carbinols and relates in particular to the production of carbinols from organic hydroperoxides.

It is known that organic hydroperoxides can be reduced to furnish the corresponding carbinols and that, for instance, phenyldimethyl carbinol is produced when isopropylbenzene hydroperoxide is subjected to a reduction treatment. This reduction may be effected by reducing agents such as sodium sulphite, sodium sulphide, ferrous sulphate or hydrogen iodide. More economical as regards costs and reaction space is the reduction of the hydroperoxide by means of hydrogen with the aid of a catalyst.

Although many hydrogenation catalysts, such as nickel, copper, platinum, palladium, silver, osmium or iridium, are known which will bring about this reaction between hydrogen and a compound which will act as a hydrogen acceptor, some of these cannot be used satisfactorily for the reduction of hydroperoxides owing to a tendency of the metal to catalyse decomposition of the hydroperoxide into other products such as ketones or aldehydes containing fewer carbon atoms than the initial hydroperoxide. For example, if isopropylbenzene hydroperoxide is treated with hydrogen in the presence of a nickel catalyst, such as Raney nickel which is now frequently used for reduction reactions in the organic field, rapid decomposition of the hydroperoxide takes place; very little hydrogen is absorbed and the resulting product is a mixture of the desired phenyldimethyl carbinol with aceptophenone and material having a higher boiling point, and the nickel catalyst is deactivated such that it can no longer be used as an effective hydrogenation catalyst. Similar reactions occur when copper or copper chromite catalysts are used. It is further known to use platinum as a catalyst for the reduction of hydroperoxides with hydrogen, but it has been found that appreciable side reactions occur and unless the hydroperoxide is diluted with a water-miscible solvent, the catalyst frequently becomes inactivated by the coagulating effect of the water formed. In addition, the catalyst after use must be handled carefully owing to its tendency to spontaneous ignition in air which may ignite organic material used as filtering media, such as paper or cloths. Furthermore, after repeated use, the catalyst may become so finely divided that it cannot be filtered except with the use of filter aids and may take a prolonged time to settle to the bottom of a reaction vessel, thus making separation by decantation difficult. The same or similar difficulties arise with colloidal palladium and palladium black.

It has now been found that the use of a palladium catalyst supported or adsorbed on an active alumina carrier in the production of carbinols by catalytic hydrogenation of hydroperoxides avoids all the above disadvantages.

The process for the production of carbinols according to the present invention therefore comprises reacting an organic hydroperoxide containing the same number of carbon atoms as the desired carbinol under liquid conditions with hydrogen using palladium supported on activated alumina as catalyst.

The palladium catalyst supported by or adsorbed on an activated alumina carrier is known per se and may be prepared in the known manner. For instance, activated alumina may be impregnated with an aqueous solution of palladium salt and the resulting mixture subjected to a reduction process, for instance by treatment with formaldehyde or another reducing agent or by conducting hydrogen over it.

The expression "under liquid conditions" is intended to mean that the hydroperoxide should be at least partly in the liquid form, for instance, by working at a temperature at or exceeding the melting point of the said hydroperoxide when this substance is a solid at temperatures below about 80° C., or by dissolving it wholly or in part in a solvent which is liquid at the temperature at which the hydrogenation is to be effected and which is inert towards the hydroperoxide. Such a solvent may itself be reducible under the reaction conditions if desired, but it should not inhibit the hydrogenation of the hydroperoxide nor poison the catalyst. As examples of suitable solvents may be mentioned water, alcohols, hydrocarbons and some ketones, ethers and esters, either alone or in admixture.

Further, the hydroperoxide in a liquid condition as above defined may be suspended or dispersed in a liquid in which it is not soluble; for example, isopropylbenzene hydroperoxide dissolved in isopropylbenzene containing acetophenone and phenyldimethyl carbinol may be dispersed in water to simplify heat transfers problems arising by the reaction.

It is advantageous to maintain the pH of any aqueous phase which may be formed during the reaction or be present from the beginning at a value between 7 and 12, for instance, by the addition of small amounts of sodium carbonate, since prolonged exposure to acid conditions tends to damage the alumina support.

The process according to this invention may thus be carried out in a water-immiscible organic solvent as it has been found that the water resulting from the reduction does not materially affect the activity of the catalyst. Suitable water-immiscible solvents are for instance benzene and its homologues, or paraffinic hydrocarbons such as the mixture known as petroleum ether. It is, however, preferred to use as solvent the initial compound from which the hydroperoxide is derived, and with special advantage, the solution of the hydroperoxide obtained by the autoxidation of the said initial compound. Part of the unreacted initial compound may be removed, for instance by evaporation, before the mixture is subjected to the hydrogenation treatment according to the invention.

The hydrogenation reaction may be carried out within a wide range of temperatures, the preferred temperature varying with the hydroperoxide used. It has been found that the hydrogenation will take place at 0° C. and even below this temperature but that higher temperatures, such as between 40° and 120° C., may be used with great advantage whereupon the reaction proceeds with great rapidity. It is surprising that at these higher temperatures practically no by-products are formed and that the reaction stops with the formation of the respective carbinol whilst with other metal reduction catalysts at temperatures in this range, further hydrogenation with the formation of the corresponding hydrocarbon or decomposition to a ketone or aldehyde readily occurs. In the case of aromatic hydroperoxides hydrogenation of the aromatic nucleus may also occur with other metal reduction catalysts.

The amount of palladium in and on the alumina as well as the amount of catalyst to be used for the process of the invention may vary within wide limits. For instance, from 1–20% by weight based on the amount of hydroperoxide to be subjected to the hydrogenation process of a palladised alumina catalyst containing 0.7% palladium has given good results.

At the end of the hydrogenation reaction, the catalyst readily settles at the bottom of the reactor. By placing a fritted glass or similar filter in a sump under the reactor, the liquid reaction mixture may be completely withdrawn and separated from the catalyst without the latter clogging up the filter. The catalyst may be used again by filling the reactor with fresh hydroperoxide-containing solution or suspension.

The filtered liquid will comprise the carbinol, solvent if used and the water of reaction, the latter of which may be removed by simple physical means of separation, or by azeotropic distillation, or when the amount is small by use of a dehydrating agent such as sodium or magnesium sulphate. The catalyst may be re-used for the reduction of further amounts of the same or another compound or it may be washed with a suitable solvent, for instance, methanol or ethanol, and stored for re-use at a later time.

The carbinol produced by the hydrogenation process according to the invention may after filtering free of catalyst be recovered from the hydrogenation reaction mixture in any suitable manner, such as, for instance, by decantation from the water, by extraction with suitable organic solvents, or by distillation.

The process of the invention may be applied to the hydroperoxides of aliphatic compounds such as tertiary butyl hydroperoxide and those of aromatic compounds and in the latter case to secondary hydroperoxides, such as ethyl benzene hydroperoxide, or to tertiary hydroperoxides, such as isopropylbenzene hydroperoxide or paracymene hydroperoxide. It may also be applied to the hydrogenation of dihydroperoxides such as meta- or para-diisopropylbenzene dihydroperoxide with the production therefrom of the corresponding dicarbinols and/or carbinol hydroperoxides. In the same manner, tertiary and secondary aromatic hydroperoxides which are substituted by, for instance, an alkyl group or an hydroxylated alkyl group in the aromatic nucleus may be converted into the corresponding carbinol compounds. Thus, for instance, $\alpha,\alpha$-dimethyl-(2-hydroxy-2-propyl)benzyl hydroperoxide is converted into di-(2-hydroxy-2-propyl)benzene by the process of the invention.

The carbinols produced by the process of the invention may be used for the manufacture of organic peroxides in which two organic radicals are linked by a peroxy group and which find useful application on a large scale as polymerisation or vulcanisation catalysts for instance in the manufacture of synthetic rubbers.

The following examples illustrate the way in which the process according to the invention may be carried out in practice. The parts by weight have the same relation to the parts by volume as kilograms to litres.

*Example 1*

The catalyst was prepared by dissolving 1 part of palladous chloride in 40 parts by volume $$\frac{N}{10}$$

hydrochloric acid with heating to 70° C. This solution was then poured into a suspension of 100 parts by weight of chromatographic alumina in 200 parts by volume of water at 70° C. One part by volume of 40% aqueous formaldehyde solution was added to the mixture while stirring to reduce the palladous chloride. After a few minutes, 50 parts by volume of a 5% sodium bicarbonate solution was added with gentle stirring and the mixture then left standing for thirty minutes, maintaining the temperature of the mixture all the time at 70° C. The catalyst was then washed by decantation with two lots of 200 parts by volume of water, filtered off and dried at 100° C. for two hours. The resulting product contained about 0.7% palladium by weight.

The hydrogenation reactor consisted of a glass vessel having at the bottom a sump fitted with a fritted glass disc through which hydrogen could be introduced in fine dispersion, or by substituting a vacuum line for the hydrogen feed, the reaction mixture could be sucked out free of catalyst. The reaction was fitted with an agitator designed to keep the catalyst in suspension and a reflux condenser up which the excess hydrogen passed.

100 parts by weight of crude isopropylbenzene hydroperoxide, obtained by oxidising isopropylbenzene to about 40% conversion and stripping off most of the unchanged isopropylbenzene so that the final concentrate contained 83% isopropylbenzene hydroperoxide together with isopropylbenzene, about 4% phenyldimethyl carbinol and 1% acetophenone, and some sodium carbonate solution as stabiliser, were introduced to the reactor. 20 parts of the catalyst prepared as described above were moistened with isopropylbenzene hydroperoxide (to avoid igniting any hydrogen-air mixture in the reactor) and introduced. After purging the reaction and circulation space with hydrogen to remove all air, the stirrer was started.

A vigorous absorption of hydrogen commenced at once and the temperature rose. By adjusting the rate of stirring, any desired temperature could be maintained. When kept at 45° C. full absorption of hydrogen was effected in four hours. With external cooling, the hydrogenation could be effected also in 2½ hours, maintaining the reaction mixture at the same temperature. When the absorption of hydrogen ceased, the agitation was stopped and 50 parts of the reaction mixture including much of the water of reaction, which settled out, were removed via the filter disc in the sump by applying suction. These 50 parts were replaced by a further 50 parts by weight of fresh crude isopropylbenzene hydroperoxide and the hydrogenation continued.

In this manner, a total of 750 parts by weight of isopropylbenzene hydroperoxide were hydrogenated and the tmie taken to reduce the last 50 parts did not exceed that taken for the first 50 parts.

The phenyldimethyl carbinol produced by the hydrogenation was recovered in a pure state, after decanting from the water produced in the reaction, by fractional distillation from the reaction mixture, of which it constituted approximately 86% by weight.

The excess hydrogen was returned to the reactor via the sump. The hydrogen consumed by the reaction was replaced by fresh hydrogen.

When the same reaction was carried out using active chromatographic silica impregnated with palladium as the catalyst it was found that the hydrogenation took 10 hours as against 2½ hours with the alumina supported catalyst, the amount of palladium metal being the same in both cases.

*Example 2*

The reactor described in Example 1 was charged with 50 parts by volume of crude hydroperoxide solution produced by oxidising meta-diisopropylbenzene and containing about 50% by weight of monohydroperoxide, 4% by weight dihydroperoxide, 4% carbinol hydroperoxide, 15% monocarbinol and 17% meta-diisopropylbenzene. 5 parts by weight of the catalyst prepared as described in Example 1 were added. The temperature of the reaction mixture was maintained at 75–80° C. and the hydrogen passing through the mixture was readily absorbed thereby.

The catalyst was allowed to settle out from the liquid reaction product and was separated therefrom. It was then used for the hydrogenation of further batches of 50 parts by volume each of the meta-diisopropylbenzene hydroperoxide solution until in this way, 1,250 parts by weight of the crude solution were hydrogenated. When the temperature during the reaction was allowed to fall to about 55° C. there was a tendency for the dicarbinol produced from the dihydroperoxide to crystallise out, thus tending to block the fritted glass filter. By operating at the higher temperature, this undesirable feature was avoided and a mixture of carbinols was obtained from which the mono- and di-carbinols were separated by distillation.

When the same reaction was carried out using a platinum oxide, $PtO_2$ catalyst, only about half the theoretical amount of hydrogen required to produce the carbinol was absorbed, after which no further hydrogenation would occur owing to the coagulating effect on the catalyst of the water produced. The inhibiting effect of the water upon the catalyst could be obviated by homogenising the liquid phase, for instance by the addition of methanol. The hydrogenation then continued but did not terminate abruptly with the production of the carbinol as it commenced to saturate the benzene ring, and in addition it was accompanied by the formation and further hydrogenation of appreciable amounts of ketone from the hydroperoxy groups.

*Example 3*

30 parts by weight of 1:3:3-trimethylindan-1-yl hydroperoxide (82% pure) were dissolved in 30 parts by volume of methanol and were shaken at room temperature and atmospheric pressure in the presence of 0.3 part by weight of the palladium on alumina catalyst prepared as shown in Example 1. The temperature of the mixture rose somewhat during the course of the reaction. After four hours the hydrogen absorption ceased. The catalyst was then filtered off and the solvent was removed by distillation under reduced pressure leaving 26.7 parts by weight of crystalline 1:3:3-trimethylindan-1-ol.

For comparison a similar hydrogenation was carried out with the exception that instead of using the palladium-alumina catalyst, a platinum oxide catalyst was used. 10 parts by weight 1:3:3-trimethylindan-1-yl hydroperoxide (98.5% pure) were dissolved in 30 parts by volume of methanol and subjected to hydrogenation in the presence of 0.05 part by weight of platinum oxide under the same conditions as shown above. After 2½ hours the hydrogen absorption came to an end. The product, however, would not crystallise and analysis showed that it was a mixture of which trimethylindanol was only one of the components.

In order to show the stability of the catalyst and its lasting activity the following example was carried out:

*Example 4*

The catalyst of Example 1 was left in the reactor for 18 days, exposed to the atmosphere. After this time, 1,500 parts by weight of crude isopropylbenzene hydroperoxide solution were charged in and hydrogenated at 35–55° C. The theoretical amount of hydrogen was absorbed within 30 hours. The resulting reaction mixture, when examined, was found to comprise phenyldimethyl carbinol in an amount exactly corresponding to the total amount of hydroperoxide and carbinol initially present in the feed. The acetophenone content remained unchanged.

A further 3,000 parts of crude isopropylbenzene hydroperoxide solution in lots of 1,000 parts by weight each, were hydrogenated subsequently using the same catalyst, the time required for the last lot indicating that no loss in catalytic activity had occurred.

*Example 5*

23 parts of palladium on activated alumina catalyst prepared as in Example 1 were added to a solution of 226 parts of sec-butylbenzene hydroperoxide in 858 parts of sec-butylbenzene and the mixture was agitated under 700 mm. Hg hydrogen pressure at 24.6° C. in a thermostatically controlled bath.

Hydrogen absorption was rapid and ceased abruptly after 80 minutes when substantially all the hydroperoxide was found to be reduced to the corresponding carbinol and substantially no formation of acetophenone to have occurred.

I claim:

1. Process for the manufacture of carbinols which comprises reacting, at a temperature between 40° C. and 120° C., an organic hydroperoxide selected from the group consisting of aliphatic hydroperoxides, secondary and tertiary aromatic hydroperoxides, secondary and tertiary aromatic hydroperoxides substituted in the aromatic nucleus by an alkyl group, secondary and tertiary aromatic hydroperoxides substituted in the aromatic nucleus by a hydroxylated alkyl group, and aromatic dihydroperoxides and containing the same number of carbon atoms as the desired carbinol under liquid conditions with hydrogen using palladium supported on "activated alumina" as catalyst with an amount of catalyst between about 1% and 20%, by weight, based on the weight of the hydroperoxide.

2. Process according to claim 1 wherein the organic hydroperoxide is dissolved in an organic liquid medium which is miscible with water.

3. Process according to claim 1 wherein the organic hydroperoxide is isopropylbenzene hydroperoxide.

4. Process according to claim 1 wherein the hydroperoxide is dissolved in an organic liquid medium which is immiscible with water.

5. Process according to claim 4 wherein the organic solvent is the hydrocarbon corresponding to the hydroperoxide.

6. Process according to claim 1 wherein the hydroperoxide is suspended in an inert liquid medium.

7. Process according to claim 6 wherein the inert medium is water and the pH is maintained at a value between about 7 and 12.

References Cited in the file of this patent

UNITED STATES PATENTS

| | | |
|---|---|---|
| 2,491,926 | Lorand et al. | Dec. 20, 1949 |
| 2,497,349 | Farkas et al. | Feb. 14, 1950 |

OTHER REFERENCES

Bodendorf: Chem. Abstracts, vol. 27 (1933), p. 4472.

Benton et al.: Nature, vol. 171 (February 7, 1953), p. 269.